(12) United States Patent
Keene

(10) Patent No.: US 11,221,220 B2
(45) Date of Patent: Jan. 11, 2022

(54) TO PRECISION GUIDANCE SYSTEM FOR AGRICULTURAL VEHICLES

(71) Applicant: Agricision Limited, Maidenhead Berkshire (GB)

(72) Inventor: Adam Keene, Maidenhead Berkshire (GB)

(73) Assignee: Agricision Limited

(*) Notice: Subject to any disclaimer, the term of this patent is extended or adjusted under 35 U.S.C. 154(b) by 47 days.

(21) Appl. No.: 16/344,862

(22) PCT Filed: Oct. 26, 2017

(86) PCT No.: PCT/GB2017/053227
§ 371 (c)(1),
(2) Date: Apr. 25, 2019

(87) PCT Pub. No.: WO2018/083448
PCT Pub. Date: May 11, 2018

(65) Prior Publication Data
US 2019/0265044 A1    Aug. 29, 2019

(30) Foreign Application Priority Data

Nov. 2, 2016  (GB) .................................. 1618452

(51) Int. Cl.
| G01C 21/20 | (2006.01) |
| A01B 69/00 | (2006.01) |
| A01B 79/00 | (2006.01) |
| B60R 1/00 | (2006.01) |
| G01C 21/10 | (2006.01) |
| A01B 69/04 | (2006.01) |

(52) U.S. Cl.
CPC ............ *G01C 21/20* (2013.01); *A01B 69/008* (2013.01); *A01B 79/005* (2013.01); *B60R 1/00* (2013.01); *G01C 21/10* (2013.01); *B60R 2300/8086* (2013.01)

(58) Field of Classification Search
CPC .. G06F 7/02; G06F 11/1471; G06F 2207/025; G06F 2207/222
See application file for complete search history.

(56) References Cited

U.S. PATENT DOCUMENTS

| 5,945,917 A * | 8/1999 | Harry ................... A01B 69/008 340/815.45 |
| 2017/0245419 A1* | 8/2017 | Barbosa ............... A01B 79/005 |
| 2017/0354079 A1* | 12/2017 | Foster .................. A01B 69/008 |

FOREIGN PATENT DOCUMENTS

EP    2 690 406 B1    12/2016

OTHER PUBLICATIONS (Australia) Examination report for application 2017352853, dated Oct. 11, 2021, Australian Government (IP Australia).
(Continued)

*Primary Examiner* — Rodney A Butler
(74) *Attorney, Agent, or Firm* — Muskin and Farmer LLC

(57) ABSTRACT

The present invention relates to products and systems to assist in the accurate guidance of agricultural vehicles such as tractors, harvesters, sprayers and their attached implements. In particular, it relates to driver-led precision guidance systems and products which assist in ensuring that a vehicle is tracking along the most effective path for the activity being carried out and making maximum use of the available land space when fertiliser spreading, spraying, cultivating and drilling etc.

17 Claims, 5 Drawing Sheets

(56) References Cited

OTHER PUBLICATIONS (United Kingdom) Examination report for application GB1618452.5, dated Oct. 8, 2021, United Kingdom (UK Intellectual Property Office).

* cited by examiner

TO PRECISION GUIDANCE SYSTEM FOR AGRICULTURAL VEHICLES

CROSS REFERENCE TO PRIOR APPLICATIONS

This application is the U.S. National Phase application under 35 U.S.C. § 371 of International Application PCT/GB2017/053227, filed on Oct. 26, 2017, which claims the benefit of Great Britain Patent Application 1618452.5 filed in the Intellectual Property Office of the United Kingdom on Nov. 2, 2016, both applications are incorporated by reference herein in their entireties.

The present invention relates to products and systems to assist in the accurate guidance of agricultural vehicles such as tractors, harvesters, sprayers and their attached implements. In particular, it relates to driver-led precision guidance systems and products which assist in ensuring that a vehicle is tracking along the most effective path for the activity being carried out and making maximum use of the available land space when fertiliser spreading, spraying, cultivating and drilling etc.

Most operations undertaken by agricultural tractors around the world are in parallel passes. For many years, agricultural workers have faced difficulties when looking to ensure that agricultural vehicles are travelling along the most efficient path for the activity that is being carried out i.e. that the passes are remaining parallel and spaced to maximise efficiency.

For example, a typical operation might be spreading fertilizer at 12 m. The aim is to maximise pass-to-pass accuracy so the vehicle travels up and down the field on a path that provides neither overlap nor wasted space between passes. If the path taken by the vehicle tracks back on itself too closely, the fertiliser which is being spread by said vehicle is wasted and may be environmentally damaging, due to overlap. Alternatively, if the path taken by the vehicle does not track back on itself closely enough the available land will not be used efficiently, resulting in areas with no or poorer crop growth.

Research shows that even experienced operators/drivers overlap and/or skip large areas when asked to undertake this operation without guidance.

The use of precision guidance systems is becoming one of the more popular advancements in farming and replaces the need for tactile guidance systems and physical row markers to be placed into fields in advance of the agricultural vehicle being used. At the higher end, such systems use a combination of GPS and steering actuators and have the capability to steer an agricultural machine across the field to follow a predetermined efficient path without driver input. At the end of the field, the driver must steer the machine to the next pass where the auto-steering system will steer itself as directed. Whilst highly accurate, the cost of the high-end systems means that they are only appropriate for use in very large farms.

At the lower end of the market, GPS guidance systems take the form of a GPS antenna which is typically mounted on the roof of the vehicle and an in-cab (or in vehicle) display device in the form of a light bar that the driver places next to them or attaches to the inside of the windscreen and which communicates with the antenna and provides a visual indication to the driver as to whether they are straying from the preferred line. Such systems can assist the driver but require the driver to regularly reference check them, and this repetitive checking isn't always appropriate or carried out.

For all guidance applications, the pass-to-pass accuracy (short-term repeatability) needs to be as close as possible. The higher end auto-steer guidance systems can have a pass-to-pass accuracy of within 2 cm of the desired line which allows accurate use for sprayer, fertilizer spreader, tillage equipment and to plant soybeans or row crops such as corn or wheat. The lower end systems remain fairly accurate but are still prone to user error, particularly if the user is not checking the preferred line often enough. This can in fact be problematic as, for safety reasons, the driver must be aware of the outside environment so is continuously looking back and forward between the in-cab display and the field or area ahead of the vehicle.

The present invention aims to obviate or mitigate some of the problems associated with prior art precision guidance systems and devices.

Throughout this document references to agricultural vehicles may encompass any sort of vehicle for which a precision guidance system would be advantageous and includes, but is not limited to a combine harvester, a forage harvester, a transport vehicle, a tractor, and All-Terrain Vehicle, an aircraft and/or a powered and/or steerable trailer. Where examples are described with reference to a particular vehicle it would be understood that this could equally apply to another agricultural vehicle.

According to an aspect of the present invention there is provided a precision guidance system for a vehicle comprising;

a Global Positioning System (GPS) sensor configured to provide information representative of a geographic location of the vehicle;

a guidance module which includes map data and which is adapted to define travel paths and to process the GPS data from the GPS sensor by comparing the location data from the GPS sensor to the map data to determine if the vehicle is on a defined travel path;

a display device comprising one or more visual elements and a display control module;

wherein the display device receives information from the guidance module and provides a visual indication as to whether the vehicle is on the defined travel path;

characterised in that the display device is mountable on the outside of the vehicle within the user's field of vision.

A precision guidance system for a vehicle comprising;

a display device comprising an outer casing, one or more visual elements and a display control module;

a Global Positioning System (GPS) sensor configured to receive information representative of a geographic location of the vehicle, said GPS sensor being housed within the outer casing of the display device;

a guidance module which includes map data and which is adapted to define travel paths and to process the GPS data from the GPS sensor by comparing the location data from the GPS sensor to the map data to determine if the vehicle is on a defined travel path;

wherein the display device receives information from the guidance module and provides a visual indication via the visual elements as to whether the vehicle is on the defined travel path;

and wherein the display device is mountable on the outside of the vehicle, within the user's field of vision.

Preferably the vehicle is an agricultural vehicle.

Preferably, the travel paths are associated with a cultivated field.

The GPS sensor/receiver is configured to receive information representative of a geographic location of the vehicle at a particular time. The GPS sensor may also comprise a GPS antenna. Preferably this also includes velocity data, or the guidance module may be adapted to calculate velocity data, based on GPS data over time.

Optionally the system further comprises an inertial measurement unit (IML) device or means for detecting velocity and acceleration to compensate for the effects of body roll/lean.

Preferably, the display unit contains a power source.

Preferably the power source is in the form of a battery.

Preferably the display device is mountable onto the bonnet of the vehicle.

Most preferably a portion of the outer casing is a display panel comprising a plurality of visual elements.

Preferably, the plurality of visual elements are lights which can be turned on or off.

Preferably the visual elements are light-emitting diodes (LEDs). The LEDs are controlled by the display control module. Optionally the LEDs are provided in groups or clusters, with each group or cluster forming a visual element.

Preferably the visual elements have 10 to 15 mm height.

Preferably the plurality of visual elements form an array.

Most preferably the array comprises seven LED units.

The brightness of the LEDs can be variable and also the LEDs flash and speeds are also controlled variably.

Preferably the bottom surface of the outer casing comprises one or more magnets or magnetised zones.

Advantageously, the one or more magnets or magnetised zones allow for easy, rapid and secure attachment to the outside of the vehicle.

Preferably the outer casing is attached or attachable to the bonnet of the vehicle.

In many cases the bonnet is made of a metal material to which a magnet will attach, however in cases where the outer portion of the vehicle which is within the user's field of vision is not of a suitable metal material, the system comprises additional attachable metal portions that can be provided which themselves attach to the vehicle by an appropriate method such as gluing or screwing. The magnet can then attach to the metal portions.

Optionally the outer casing is shaped such that the lower surface is at least partially arcuate. The lower surface may be arranged such that it has one or more feet that attach to the outer surface of the vehicle.

As the GPS sensor is contained within the outer casing of the display device this eliminates the need for a separate GPS receiver as is found in more complex systems. In fact, by including the visual elements, GPS receiver, antenna if present and power source into the outer casing this provides a uniquely portable navigation system that only requires the user to link to their preferred interface such as a mobile phone or tablet.

Optionally, a separate GPS antenna may be mountable on the vehicle.

Preferably the GPS data is transmitted to the guidance module via wireless communication. Most preferably the GPS data is transmitted to the guidance module via Bluetooth®.

Preferably, the inertial measurement unit (IMU) device is contained within the outer casing of the display device.

Preferably, information from the guidance module is transmitted to the display control module or the display unit via wireless technology. Most preferably information from the guidance module is transmitted to the display control module or the display unit via Bluetooth®.

Preferably, the guidance module is provided as software, preferably downloadable software, that can be run on a mobile phone or tablet.

According to another aspect of the present invention there is provided a display device for use with the precision guidance system of the first aspect characterised in that the display device is mountable on the outside of the vehicle, but in the user's field of vision.

According to another aspect of the present invention there is provided a method of guiding the turn of a vehicle, comprising the steps of;

recording data relating to the turning of the vehicle;

identifying when the vehicle has turned more than x° from a first line on the preferred path;

using the recorded data to predict the turning arc of the vehicle from said first line to a second line on the preferred path;

providing guidance using the system of the first aspect.

Preferably, to predict the turning arc of the vehicle, points 1, 2 and 3 are produced and are calculated as follows;

$$D\text{Point } 1 = \lambda/100 \times P_1$$

$$D\text{Point } 2 = \lambda/100 \times P_2$$

$$D\text{Point } 3 = \lambda/100 \times P_3$$

where D is the distance along the predicted turn onto course line from the new course line, $\lambda$ is the circumference of the recorded turn off course line and $P_1$, $P_2$ and $P_3$ are constants Notably the number of D points is not limited to 3.

It will be understood that GPS could encompass any satellite global navigation satellite system.

References to Bluetooth® include Bluetooth Smart, BR (basic rate), EDR (enhanced data rate) and LE/BLE (low energy).

In order to provide a better understanding of the present invention, embodiments will now be described by way of example only and with reference to the following figures in which.

Figure 1:
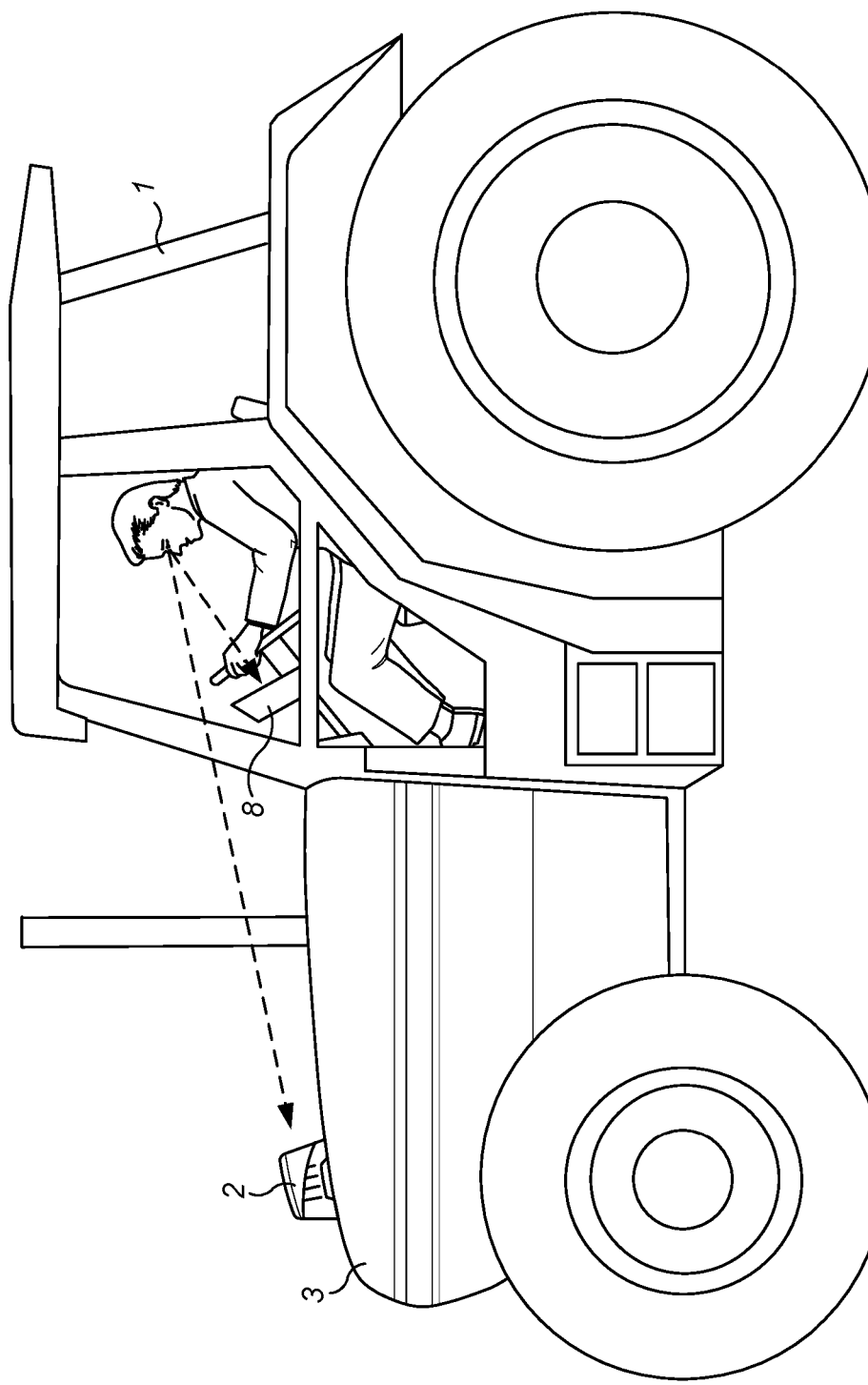
FIG. 1 shows a tractor with a display unit attached.
Figure 5:
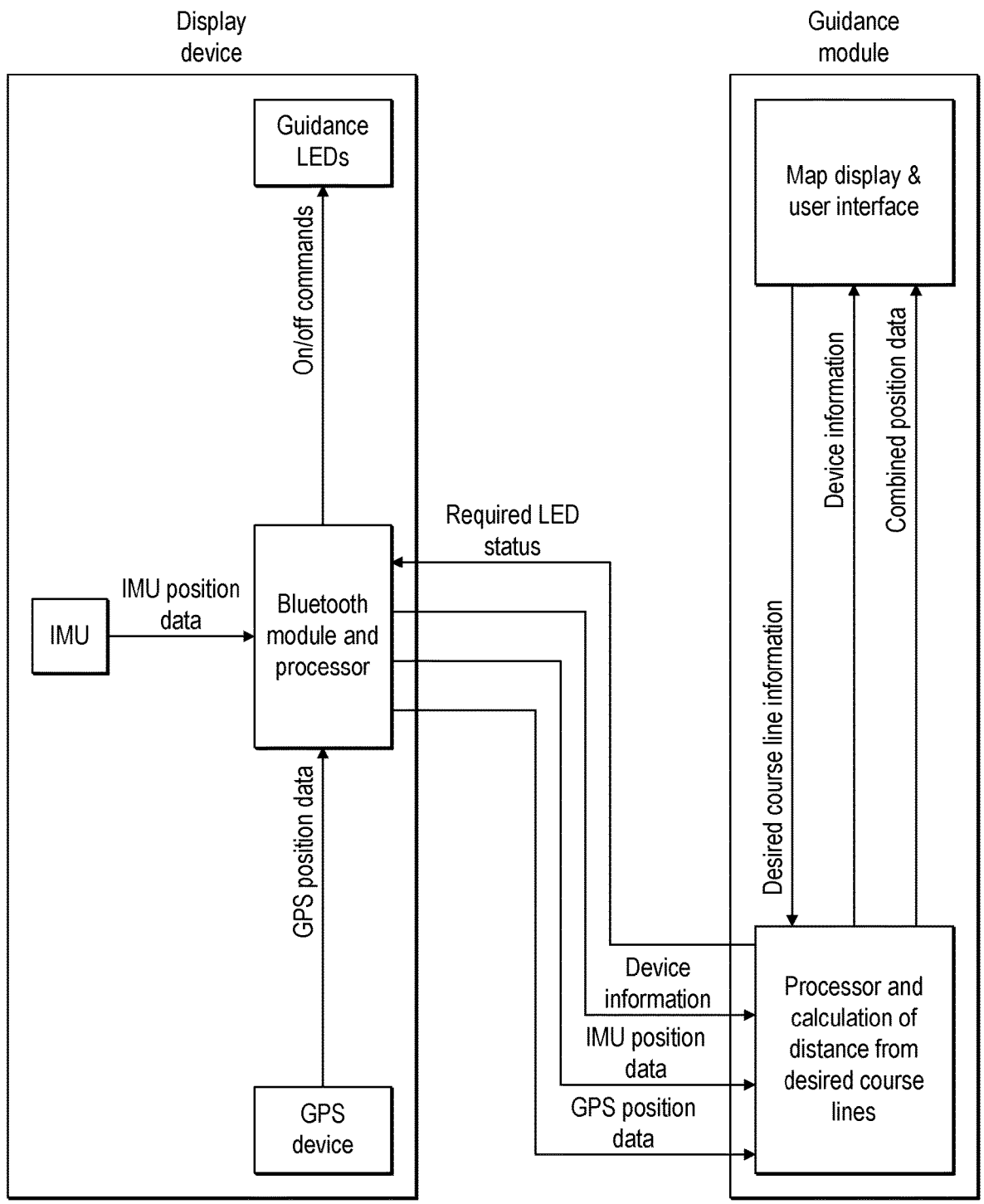
FIG. 5 is a flow diagram showing the system of the invention.

An exemplary device in use is shown in FIG. 1. FIG. 5 is a flow diagram showing the system in use. A tractor 1 (or other agricultural vehicle) is provided with a display unit 2 that is mountable to the bonnet 3 or outer front portion of the tractor 1. In this example, the display unit 2 is in the form of a shaped box that contains a control module (not shown) and a visual display panel 4 that is positioned on one wall of the box such that it will be in the driver's field of vision when the display unit 2 is mounted on the bonnet 3.

Figure 2:
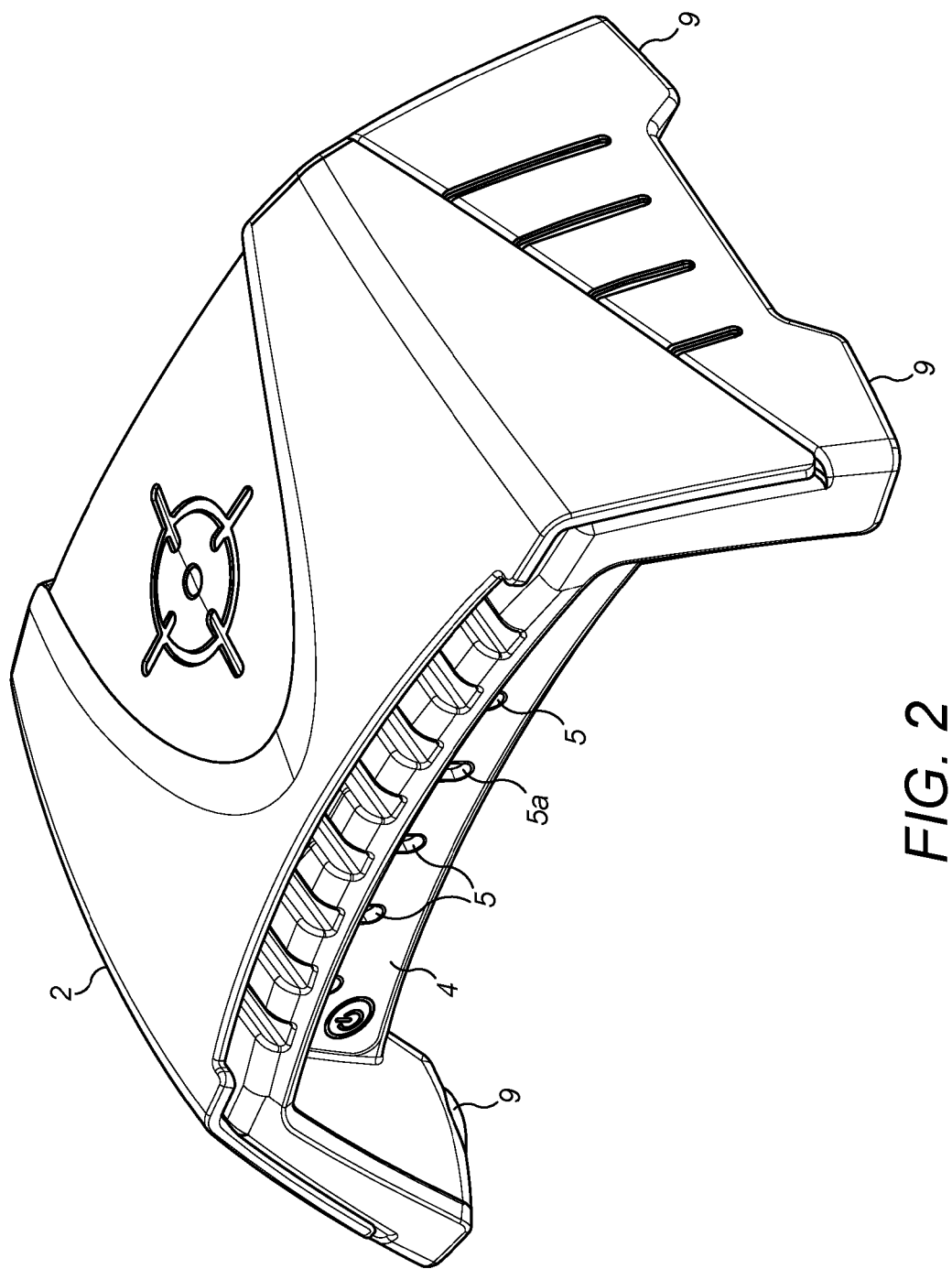
FIG. 2 is a diagram of a display unit.

Advantageously, the display unit 2 shown in FIG. 2, is mounted on the bonnet 3 on the outside of the tractor 1 (and is not within the cab or inside of the tractor 1 or vehicle). The display unit is mountable within the user's field of vision when they are looking ahead of the vehicle. The display unit 2 is in the form of a box or casing, with the lower surface shaped appropriately to sit on the surface of a tractor or agricultural vehicle bonnet 3—typically this is an arcuate shape with four rubberised feet 9 portions that will contact the bonnet 3 surface. At least part of the underside surface of the display unit 2 that is going to come into contact with the bonnet 3 is a magnet or magnetised area. In this embodiment, the four rubberised feet 9 are magnets that will attach to the metallic surface of the tractor bonnet 3. This allows for easy and rapid attachment and detachment—particularly useful if a user wants to move the unit 2 to another vehicle. It will be appreciated that the display unit 2 could be an alternative shape. Also, if the bonnet 3 to which the unit 2 is to be fixed does not have an appropriate metal surface, metal discs or elements can be provided which can first be affixed to the bonnet 3, or alternative fixing mechanisms could be used.

Ideally the display unit 2 is positioned or positionable on the bonnet 3 between 0.5 and 3 meters from the operator's position when driving and within, but not disrupting, the operator's field of vision when looking out of the front of the cab. This has the significant advantage that the visual display panel 4 is within the user's field of vision but is not obscuring their vision. As such, the user is not required to look back and forward between objects. This provides a safety aspect, as the driver remains looking at the field in front of them (with the visual display panel 4 simply sitting within the field of vision), reduced driver fatigue (due to the reduced requirement for rapid and repeated visual accommodation between distant and near objects) and improved performance as the driver is immediately aware of any deviation from the preferred path 7.

Figure 3:
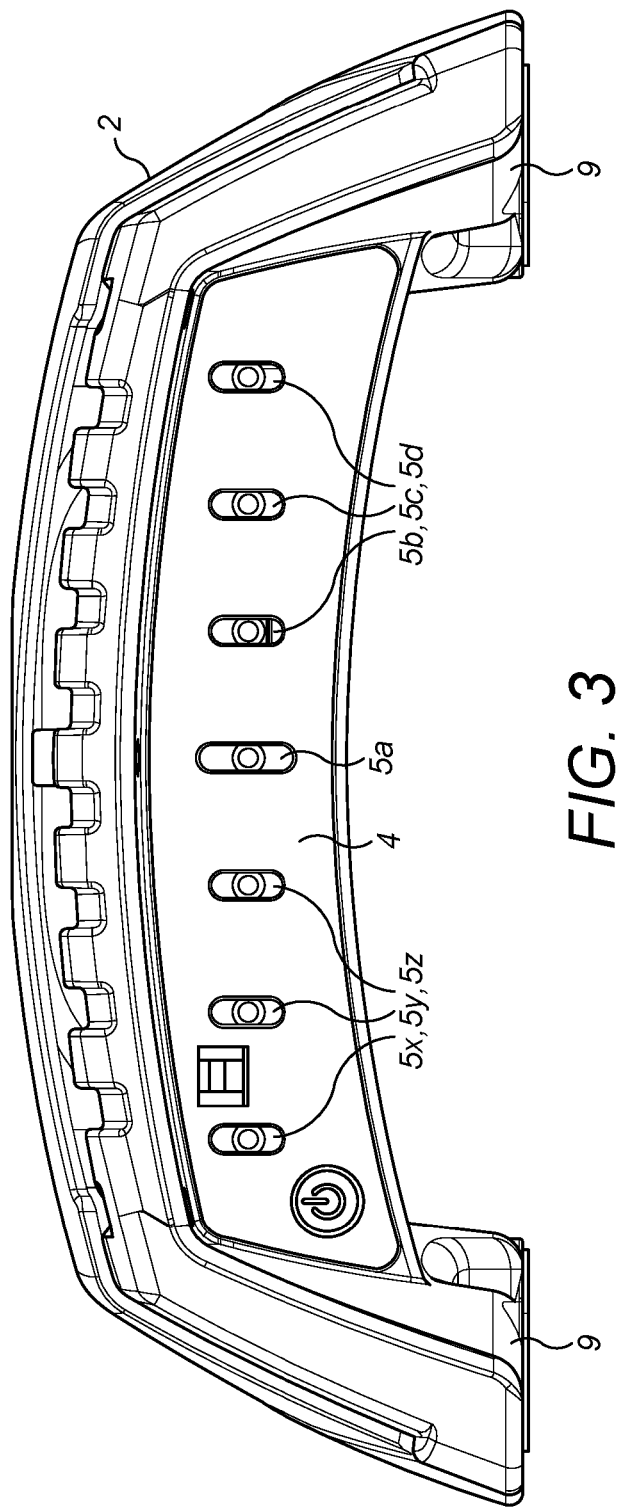
FIG. 3 is a diagram showing the visual display panel.

The visual display panel 4 comprises a number of lights or LEDs 5 as best seen in FIG. 2 and FIG. 3. The LEDs 5 are selected to be visible when lit even in bright sunlight conditions. The LEDs 5 form an array of lights of a size that can easily be seen by the user. The brightness of the LEDs 5 can also be variable and also the LEDs 5 flash and speeds are also controlled variably. The display unit 2 also contains a GPS antenna and transmitter/sensor. The GPS sensor receives location information from GPS that is representative of the geographic position of the tractor 1. The display unit 2 also contains a power source, which in this example is in the form of a battery.

The display unit 2 can also contain an inertial measurement unit (IMU) device or means for detecting velocity, acceleration and magnetic orientation. An IMU measures and reports a body's specific force, angular rate, and sometimes the magnetic field surrounding the body, using a combination of accelerometers and gyroscopes, sometimes also magnetometers.

It would be appreciated that, although in this embodiment the GPS antenna is housed in the display unit 2, it could in fact be separate from the display unit 2 and independently mountable on or in the tractor 1. It is however particularly beneficial to have as much as possible of the required navigational equipment within the casing or housing of the display unit as the allows it to be easily portable—the user simply needs the display unit, which can be used with the user's preferred user interface device—for example a tablet or mobile phone. This is particularly useful in cases where a user may want to quickly transfer the system to another agricultural vehicle, overcoming the need to purchase multiple units for multiple vehicles.

Figure 4:
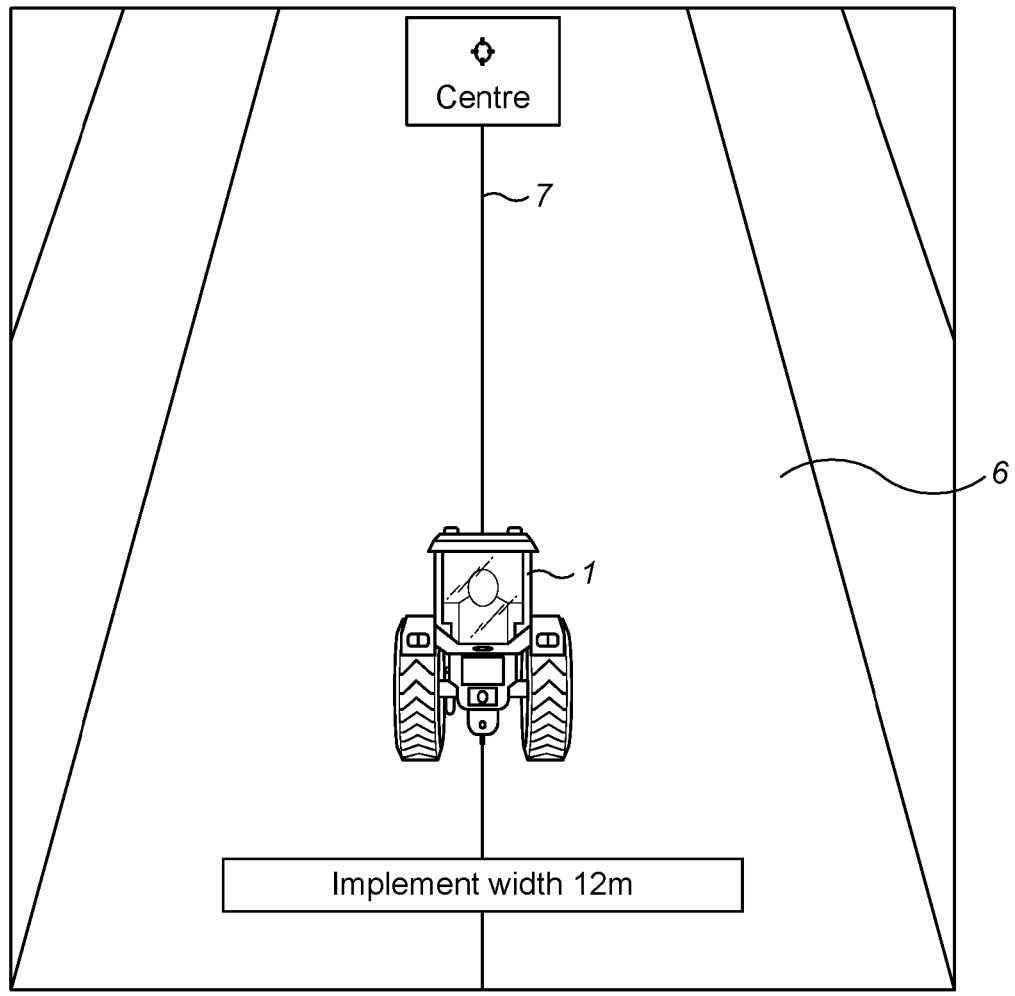
FIG. 4 is a diagram showing a tractor following a preferred path.

The tractor 1 is to be guided according to a map that is stored in a guidance module and which identifies a preferred route or travel path 7, as shown in FIG. 4. It will be appreciated that the various algorithms that can be used for calculating the preferred travel path for a straight pass and deviation therefrom are known to one skilled in the art. In this particular embodiment, the guidance module is provided with a user interface on a mobile phone 8 that the driver of the vehicle has in the vehicle cab. It will be appreciated that the device could be a proprietary unit, but could also be a tablet, mobile phone or similar device onto which the software for the guidance module is provided e.g. it may be downloadable as an app. Notably, the guidance module is integrated into a product that is separate to the display unit 2 such that it can be taken into the cab of the tractor 1 and accessed by the user whilst the display unit 2 and associated visual display panel 4 remains outside of the tractor 1. The map may include information representative of the preferred route or travel path 7 of the tractor 1 in the field 6 and the guidance module may take into account details regarding the vehicle and mode of operation thereof. For example, a centerline or A-B line may be defined on the map based on the size of the field and the dimensions of the vehicle e.g. a 12 meter fertiliser spread trajectory. The guidance module receives positioning information via Bluetooth® from the control module, and GPS antenna (and data from the IMU) and continuously or semi-continuously compares the GPS location of the vehicle 1 to the preferred travel path 7 on the map to determine whether the tractor 1 is on course or deviating from the preferred travel path 7. The system converts this information into a visual signal for the driver by transmitting data, via Bluetooth®, to the control module in the display unit 2.

As shown in FIG. 3, seven LEDs 5 are arranged horizontally, and symmetrically about the center-line of the visual display panel 4 and facing the tractor cab. The center LED 5a is green and the remaining LEDs 5 are red. The LEDs 5 on the visual display panel 4 are controlled by the control module (which receives information via Bluetooth® from the guidance module) and change depending on whether the tractor 1 is moving along a predetermined preferred travel path 7 or whether it is moving off the preferred direction or vector of travel. Typically, if the tractor 1 is on the correct predetermined path 7 the central LED 5a on the visual display panel 4 will show as a green light. In an alternative embodiment, all of the LEDs 5 will be green when the tractor is on the preferred travel path 7. If the tractor 1 begins to deviate from the preferred travel path 7, for example by moving too far to the right, then the control module will, in accordance with the data received from the guidance module, cause the visual display panel to indicate this to the driver. In this embodiment, one or more of the LEDs 5b, 5c and 5d which are positioned to the right side of the driver's field of vision (and to the right of the central LED 5a) will light up with a red colour—and in some embodiments the central LED may either change colour, dim or go off. The more red lights that are lit, the further off course the vehicle is and the more corrective action is required by the driver. Once the tractor 1 is back on course, the central green LED 5a will light up and the red lights 5b, 5c and 5d to the right will go off. A similar array of red lights, 5x, 5y, 5z are provided to the left of the central light 5a. Essentially, when the vehicle 1 deviates from the preferred travel path 7, the visual display indicates the direction in which to make a course correction (i.e. to the right or to the left) and relative magnitude of the course correction. The calculations regarding how many lights to turn on or off are carried out by the guidance module, although could occur in the control module. For example, if the vehicle deviates to the right of line, a light will illuminate to indicate to the operator to steer to the left. As the operator makes course corrections, the illuminated light may be turned off (if the course correction has been successful) or an additional adjacent light may be illuminated (if the course correction has been unsuccessful) to indicate the result of the correction. The operator continues to make course corrections until the center light 5a of the array is illuminated thereby indicating that the course of the vehicle coincides with preferred travel path 7.

In some embodiments, the display unit 2 is also provided with a power button and/or a charging and power LED which can indicate the power status of the display unit 2.

It will be understood that although the above example describes a preferred version of the visual display, there are many variances that could be made to how the lights indicate that the tractor is moving from the preferred path. More lights could be used, lights could only show when there is a deviation from the preferred path, lights could take the shape of arrows or chevrons, lights could flash to show different variances in distance from the line etc.

Predictive Headland Turning

In another embodiment, which may be based on the embodiment described above, the system also provides guidance when turning from one pass to the next. Some guidance systems do provide some guidance by directing the operator/driver using the lights/LEDs as they are approaching the end of a pass, however the turns are often inaccurate and the current systems work to correct any deviation from the new lie rather than avoiding deviation. In this embodiment, the system uses the previous turn or the previous part of a turn to guide the operator of the tractor or vehicle during the turn.

The system uses the IMU and GPS sensors in the device and the GPS position to record the turn the user makes off of the previous pass. This recorded data is used to predict the next turn onto the preferred travel path and enhances the accuracy and the experience for the user.

When the driver begins to make a turn off the current course line the application will sense this rapidly and begin to map the path of the vehicle by looking at the recorded data and predicting the curvature of the turn.

The sensors within the hardware device will assist with this.

Once the vehicle has turned more than x° from the preferred path, the recorded path is mirrored to produce and display a predicted turn onto the next course line. Points 1, 2 and 3 will be produced and displayed and are calculated as follows;

$$D\text{Point } 1 = \lambda/100 \times P_1$$

$$D\text{Point } 2 = \lambda/100 \times P_2$$

$$D\text{Point } 3 = \lambda/100 \times P_3$$

where D is the distance along the predicted turn onto course line from the new course line, $\lambda$ is the circumference of the recorded turn off course line and $P_1$, $P_2$ and $P_3$ are constants.

If the driver crosses the new preferred path, the LEDs will work normally according to steering angle required until a new preferred path is determined in the usual way. The predicted turn onto the preferred path will then be applied to this new line.

It will be appreciated that features from one embodiment may be appropriately incorporated into another embodiment unless technically unfeasible to do so.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

It will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A precision guidance system for a vehicle comprising;
   a portable display device comprising an outer casing, a plurality of visual elements, a power source being housed within the outer casing;
   a GPS sensor configured to receive position data representative of a geographic location of the vehicle, said GPS sensor being housed within the outer casing;
   a processor which is configured to define travel paths and to receive wirelessly the position data from the GPS sensor and compare the position data from the GPS sensor to map data to determine if the vehicle is on a defined travel path,
   wherein the portable display device is configured to wirelessly receive information from the process and display a visual indication using the plurality of visual elements as to whether the vehicle is on the defined travel path, and
   wherein the portable display device is mountable on a bonnet on an outside of the vehicle within a user's field of vision.

2. The precision guidance system as recited in claim 1, wherein the vehicle is an agricultural vehicle.

3. The precision guidance system as recited in claim 1, further comprising an inertial measurement unit for detecting velocity, acceleration and/or magnetic orientation.

4. The precision guidance system as recited in claim 1, wherein a portion of the outer casing is a display panel comprising the plurality of visual elements.

5. The precision guidance system as recited in claim 4, wherein the plurality of visual elements are lights configured to be turned on and off.

6. The precision guidance system as recited in claim 4, wherein the plurality of visual elements are light-emitting diodes (LEDs).

7. The precision guidance system as recited in claim 4, wherein the plurality of visual elements form an array.

8. The precision guidance system as recited in claim 7, wherein the array comprises seven LED units.

9. The precision guidance system as recited in claim 1, wherein a bottom surface of the outer casing comprises one or more magnets or magnetized zones.

10. The precision guidance system as recited in claim 1, wherein the outer casing is attached the bonnet of the vehicle.

11. The precision guidance system as recited in claim 1, wherein the outer casing is shaped such that a lower surface of the outer casing is at least partially arcuate.

12. The precision guidance system as recited in claim 1, wherein a lower surface of the outer casing is configured such that it has one or more feet configured to attach to the outside of the vehicle.

13. The precision guidance system as recited in claim 1, wherein the GPS sensor is contained within the outer casing of the portable display device.

14. The precision guidance system as recited in claim 1, wherein the position data is transmitted wirelessly to the processor via Bluetooth.

15. The precision guidance system as recited in claim 1, wherein an inertial measurement unit is contained within the outer casing of the portable display device.

16. The precision guidance system as recited in claim 1, wherein information from the processor is transmitted wirelessly to the portable display device via Bluetooth.

17. The precision guidance system as recited in claim 1, wherein the processor is provided downloadable software configured to run on a mobile phone or tablet.

* * * * *